Patented Aug. 10, 1954

2,686,185

UNITED STATES PATENT OFFICE 2,686,185

PROCESS FOR PREPARING BICYCLIC HETEROCYCLIC COMPOUNDS

Kenneth L. Kreuz, Fishkill, N. Y., assignor to The Texas Company, New York, N. Y., a corporation of Delaware No Drawing. Application June 25, 1949, Serial No. 101,486

2 Claims. (Cl. 260—330.5)

This invention relates to the production of heterocyclic compounds containing an aryl group fused to a heterocyclic nucleus. More particularly, this invention relates to a method for producing organic heterocyclic compounds containing a benzo group fused to a heterocyclic nucleus.

The utility and application of heterocyclic compounds, particularly bicyclic heterocyclic compounds wherein an aryl nucleus is fused to a heterocyclic nucleus, in the past have been restricted in scope and have been primarily of academic interest due to the fact that economic and commercial methods of preparation were not available. Recently, heterocyclic compounds such as thiophene, furan and pyrrole have become available. This invention utilizes heterocyclic compounds such as thiophene, furan and pyrrole to prepare bicyclic heterocyclics containing a benzo group fused to the heterocyclic nucleus. The invention thereby makes commercially available a number of bicyclic compounds.

The process of the invention involves passing a heterocyclic compound containing an aliphatic chain of at least four carbon atoms in vapor phase through a reaction zone containing a solid particulate contact catalyst at a temperature of at least 700° F. A bicyclic heterocyclic compound containing a benzo group fused to the heterocyclic nucleus is recovered from the reaction product. The preferred aspect of the invention involves passing a heterocyclic compound containing an aliphatic hydrocarbon chain of at least four carbon atoms in the vapor phase through a reaction zone in contact with a dehydrogenation catalyst at a temperature of at least 700° F.

The type of fused aryl heterocyclic compound produced by the process is dependent to a large extent on the alkyl heterocyclic employed as a charge in the reaction. Thianaphthene, also called benzothiophene, and homologs thereof are produced by passing an alkylated thiophene compound containing an aliphatic chain of at least four carbon atoms in the vapor phase over a solid contact catalyst; coumarone, also called benzofuran, and homologs thereof are formed by contacting an alkylated furan derivative containing an aliphatic side chain of at least four carbon atoms in the vapor phase with a solid contact catalyst. Indole, also called benzopyrrole, and homologs thereof are obtained by passing an alkylated pyrrole containing an aliphatic side chain of at least four carbon atoms in the vapor phase over a solid contact catalyst. In similar fashion, dibenzothiophene and homologs thereof are obtained by contacting an alkylated thianaphthene in the vapor phase with a solid contact catalyst. The process of the invention is illustrated by the following equation showing the cyclization of 2-n-butyl thiophene to form thianaphthene.

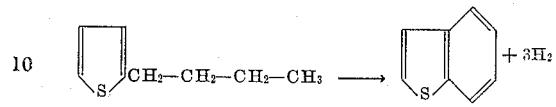

In general, heterocyclic compounds containing an aliphatic side chain of at least four carbon atoms may be employed as the organic reactant. As has been shown in the previous paragraph, the nature of the product bicyclic heterocyclic containing a fused benzo group depends to a great extent on the nature of the charge stock. There appears to be no limit on the chain length of the aliphatic group attached to the heterocyclic nucleus with the exception that the alkylated heterocyclic should be in the vapor form under reaction conditions. Both bicyclic heterocyclics and homologs thereof containing alkyl groups attached to the benzo group are obtained by cyclization of a heterocyclic compound containing an aliphatic chain of more than four carbon atoms, since the cyclization reaction is accompanied by alkyl transfer. When relatively simple reaction products are desired, it is advisable to employ a charge stock comprising an alkylated heterocyclic compound containing an aliphatic side chain of four to six carbon atoms.

A further requirement on the charge stock employed in the process of this invention is that both the carbon atom of the heterocyclic nucleus adjacent to the aliphatic side chain and the delta-carbon atom of the aliphatic chain contain a hydrogen atom or a thermally labile constituent, such as a halogen atom or a hydroxy group. The formation of a fused benzo heterocyclic compound wherein a benzo nucleus and a heterocyclic nucleus share two carbon atoms necessitates the presence on these carbon atoms of an atom or group which is readily removed during the cyclization reaction. A preferred charge to the cyclization reaction of this invention contains a hydrogen atom on both the nuclear carbon alpha to the aliphatic side chain and on the delta-carbon of the aliphatic chain. However, the cyclization process of this invention is operable when halogens, hydroxyl and carboxyl groups are present on these carbon atoms.

The process also includes the use of substituted heterocyclic compounds containing an aliphatic side chain of at least four carbon atoms. These compounds comprise substituted heterocyclics containing an aliphatic chain of at least four carbon atoms in which the substituents either remain attached to the nucleus or side chain during the reaction or are removed during the reaction to form compounds which do not have a substantially adverse effect on the cyclization. The substituents may be attached either to the heterocyclic nucleus or to the alkyl group of charge material. Examples of such substituted alkylated heterocyclic hydrocarbons are halogenated compounds, such as 2-n-butyl-5-chloro thiophene and hydroxy derivatives such as 4-(2-thienyl) normal butyl alcohol. In substituted alkylated heterocyclic compounds employed for the process of this invention, the main requirements are that both the delta-carbon atom in the alkyl group and alpha-nuclear carbon atom contain a hydrogen atom or readily replaceable group, and that the compound be vaporizable under conditions of reaction.

The heterocyclization reaction of the invention is conducted in the presence of a solid contact catalyst which may be described chemically as a solid contact material of the class of oxides and sulfides which are stable under reaction conditions. Such catalysts include metal oxides, such as molybdena, which, under the conditions of reaction, may undergo conversion to the corresponding sulfide. It is recognized that certain of the materials classified as catalysts for the subject reaction are really inert catalytically as applied to conventional hydrocarbon conversion reactions. Selection of the particular catalyst to be used depends to a large extent upon the choice of charge stock used in the reaction. The solid contact catalyst usually preferred for general application with alkylated aromatic charge stocks are the solid acid-reacting catalysts, such as amphoteric metal oxides and sulfides which are stable under reaction conditions, such as silica, alumina, etc.

Specific examples of catalysts contemplated for use in the invention are oxides of aluminum, chromium, vanadium, molybdenum, titanium, magnesium, boron, silicon and sulfides of iron, nickel, cobalt, tungsten, tin, etc., as well as mixtures and chemical combinations thereof, such as silica-alumina, acid-treated bentonitic clays, etc.

The familiar class of dehydrogenation catalysts is included within the general classification of solid acid-reacting contact catalysts and are preferred catalysts for the process of this invention. Suitable dehydrogenation catalysts are the oxides and stable sulfides of the metals of Group VIb of the periodic table. Specifically preferred dehydrogenation catalysts are chromia-alumina, molybdena-alumina and silica-chromia-alumina.

In carrying out the process of the invention, the reactants in vapor form are introduced into a reaction chamber containing a solid contact catalyst maintained at the desired reaction temperature. The catalytic reaction zone may be either a fixed bed type or a fluid type, in which latter type operation the catalyst is maintained in powder form in a turbulent state.

It is evident that the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds as well as moving catalyst beds of the Thermofor type wherein upwardly flowing gaseous reactants contact a downwardly moving catalyst bed are other possible alternatives.

It will be recognized that the conditions of cyclization will vary in accordance with the particular reactant and catalyst employed as well as the type of process technique. As a general proposition, however, a temperature of at least 700° F. and a space velocity of about 0.3 to 10, wherein space velocity defines the weights of hydrocarbon per hour per weight of catalyst are preferred in the majority of reactions.

The process of the present invention, using the prescribed catalysts and particularly dehydrogenation catalysts, such as the oxides and sulfides of metals of Group VI of the periodic table, is readily adaptable to commercial operation because the reaction proceeds at economically feasible space velocities. The required contact time of charge material with the catalyst is low and is of the order of 0.7 seconds. When employing chromia-alumina or molybdena-alumina catalysts, the cyclization of alkylated heterocyclic compounds, in which the alkyl group contains at least four carbon atoms, is advantageously effected at a space velocity within the range of one to five. At such space velocities, the capacity of a commercial unit is of reasonable magnitude to support commercial development.

Particular conditions of reaction are best illustrated by reference to the conditions involved in contacting an alkylated heterocyclic compound such as 2-butenyl thiophene with a dehydrogenation catalyst such as silica-chromia-alumina employing a fixed-bed type of process technique. In passing butenyl thiophene over silica-chromia-alumina catalyst, the space velocity advantageously falls within the range of 1.0 to 5.0. The temperature in the catalyst zone is maintained between 900 and 1400° F. and preferably between 1050 and 1250° F. It is to be understood that the specific conditions described as optimum are those which result in an optimum yield of thianaphthene (benzothiophene) from butenyl thiophene in a single pass. Where a continuous recycle process is used, it may be desirable to modify these preferred conditions of reaction in order to obtain an optimum ultimate yield of desired product.

The process period for optimum production of bicyclic heterocyclics will depend to some extent upon the charge stock and reaction conditions employed, but will generally be about one hour. In any case, periodic determination of the yield of bicyclic heterocyclic will indicate the practical period of catalyst use without regeneration. When the yield of bicyclic heterocyclic derivatives is found to fall off sharply, the catalyst may be regenerated by conventional methods, such as regeneration with air at about 1000° F., which methods are typical of the type of catalyst technique employed.

Fused bicyclic heterocyclic compounds produced by the reaction may be recovered from the reaction product in accordance with conventional methods of recovery. For example, the reaction product, obtained by cyclization of butenyl thiophene to thianaphthene, containing unreacted charge stock and cracked products of charge stock may be passed through a caustic soda solution to dissolve any acid gases formed during the reaction. If the caustic soda solution is maintained cold, thianaphthene will condense as a supernatant layer which can be drawn off therefrom and distilled. If the caustic soda solution is maintained hot, thianaphthene will steam distill therefrom and can then be separated from the water layer and purified by distillation.

The fused cyclic thiophene products of reaction may also be recovered in crude form by a simple condensation procedure using water-cooled condensers or the products may be passed into a cool body of hydrocarbon oil such as diesel fuel or furnace oil having an initial boiling point above 450° F. in which the bicyclic heterocyclic compounds condense; bicyclic heterocyclic compounds can later be recovered from the condensing oil by distillation.

The process of the invention may be further illustrated by the following specific examples.

*Example I*

2-butenyl thiophene was pre-heated to approximately the reaction temperature and charged to a catalytic fixed bed reaction chamber maintained at an average temperature of 1106° F. and atmospheric pressure. The reaction chamber contained a pelleted catalyst which consisted of a mixture of chromic oxide, silica and alumina having the approximate composition of 10 per cent $Cr_2O_3$, 5 per cent $SiO_2$ and 85 per cent $Al_2O_3$. The reactant was charged at a space velocity of approximately 2.1 weights of butenyl thiophene per hour per weight of catalyst. The catalyst was maintained on stream for a period of about 24 minutes without reaction. Crude thianaphthene of about 95% purity was obtained in a yield of about 21.8 pounds per hundred pounds of butenyl thiophene charged.

*Example II*

2-butenyl thiophene was pre-heated to approximately the reaction temperature and charged to a catalytic fixed bed reaction chamber maintained at an average temperature of 1116° F. and atmospheric pressure. The reaction chamber contained pelleted catalyst which consisted of kieselguhr impregnated with $P_2O_5$ and commercially sold as UOP No. 1. The reactant was charged to the reaction chamber at a space velocity of approximately 2.0 weights of butenyl thiophene per hour per weight of catalyst. Catalyst was maintained on stream for a period of about 24 minutes without reactivation. Crude thianaphthene of about 95% purity was obtained in a yield of about 29.4 pounds per hundred pounds of butenyl thiophene charged.

It will be understood, of course, that these examples are merely illustrative of the preferred embodiment of the invention and that other catalyst charged stocks and conditions of reaction may be employed in accordance with the previous disclosure. Coumarone and indole are prepared from furan and pyrrole derivatives containing an aliphatic chain of at least four carbon atoms. Homologs of coumarone and indole are prepared from alkylated pyrrole and furan wherein the aliphatic side chain contains more than four carbon atoms; in similar fashion homologs of thianaphthene are prepared by cyclization of alkylated thiophene containing an aliphatic side chain containing more than four carbon atoms. Homologs of thianaphthene, coumarone and indole result when the four carbon chain is substituted with alkyl groups.

Obviously, many modifications and variations of the invention as set forth above may be made without departing from the spirit and scope thereof and therefore only such limitations should be imposed as are indicated in the appended claims.

I claim:
1. A process for the preparation of bicyclic heterocyclic compounds containing a benzo nucleus fused to a thiophene nucleus which comprises passing a thiophene compound, containing an aliphatic side chain of at least four carbon atoms and a substituent selected from the group consisting of hydrogen, hydroxyl, halogen and carboxyl on the delta carbon atom of the side chain and on a nuclear carbon atom adjacent to the side chain, through a reaction zone in the vapor phase in contact with a catalyst comprising kieselguhr impregnated with $P_2O_5$ at a temperature between 700 and 1,400° F., removing from said reaction zone a reaction product and recovering from said reaction product a thiophene compound containing a fused benzo nucleus.

2. A process according to claim 1 in which the charge compound is butenyl thiophene.

References Cited in the file of this patent

UNITED STATES PATENTS

| Number | Name | Date |
|---|---|---|
| 2,272,266 | Grosse | Feb. 10, 1942 |

OTHER REFERENCES

Whitmore, Organic Chemistry, page 893, Van Nostrand, N. Y., 1937.

Bernthsen and Sudborough, Organic Chemistry, page 549, Van Nostrand, N. Y., 1925 (1922 edition).

Richter, Organic Chemistry, pp. 649–50, Wiley, N. Y., 1938.

Williams, Detoxication Mechanisms, page 194, Wiley, N. Y., 1947.